United States Patent [19]
Ferraro

[11] Patent Number: 5,897,410
[45] Date of Patent: Apr. 27, 1999

[54] COMPOSITE PRODUCT CONSISTING OF MICROFIBROUS MATERIAL AND A POLYMER FILM, USEFUL FOR COATING COLD INJECTION MOLDING MANUFACTURED ARTICLES

[75] Inventor: Cristofero Ferraro, Terni, Italy

[73] Assignee: Alcantara S.p.A., Milan, Italy

[21] Appl. No.: 08/767,637

[22] Filed: Dec. 17, 1996

[30] Foreign Application Priority Data

Dec. 18, 1995 [IT] Italy .................................. MI95A2652

[51] Int. Cl.$^6$ .............................. D06N 3/00; D06N 3/18
[52] U.S. Cl. ......................... 442/394; 442/395; 442/398; 442/334; 442/340; 442/60; 428/904
[58] Field of Search ..................................... 442/394, 395, 442/398, 334, 340, 60; 428/904

[56] References Cited

U.S. PATENT DOCUMENTS 5,277,969  1/1994  Borri et al. .
5,607,755  3/1997  Vollbrecht et al. .

FOREIGN PATENT DOCUMENTS 0 497 335   8/1992  European Pat. Off. .
0 744 489  11/1996  European Pat. Off. .

OTHER PUBLICATIONS

Patent Abstracts of Japan, vol. 010, No. 063 (C–332), Mar. 13, 1986, JP 60 199986, Oct. 9, 1985.
Derwent Abstracts, AN 93–005150, JP 04 333 674, Nov. 20, 1992.
Derwent Abstracts, AN 75–52877W, JP 49 102 802, Sep. 28, 1974.
Derwent Abstracts, AN 94–164517, JP 06 108 368, Apr. 19, 1994.
Derwent Abstracts, AN 83–779873, JP 58 144 184, Aug. 27, 1983.
Derwent Abstracts, AN 80–47203C, JP 55 067 444, May 21, 1980.
Derwent Abstracts, AN 93–148755, JP 05 084 775, Apr. 6, 1993.
Derwent Abstracts, AN 92–403217, and Japan Abstracts, vol.17, No. 119 (C–1034), Mar. 12, 1993, JP 04 300 367, Oct. 23, 1992.
Derwent Abstracts, AN 94–163596, and Japan Abstracts, vol.18, No. 383 (M–1640), Jul. 19, 1994, JP 06 106 682, Apr. 19, 1994.

*Primary Examiner*—Marion McCamish
*Assistant Examiner*—Jason Savage
*Attorney, Agent, or Firm*—Oblon, Spivak, McClelland, Maier & Neustadt, P.C.

[57] ABSTRACT

A composite product comprising an imitation leather microfibrous fabric and an impermeable polymer film coupled thereto by an adhesive material, said impermeable film being so selected that it will adhere as a coating on a polymeric plastic article manufactured in a mold by the cold injection molding technique at the time of the injection molding operations for preparing said polymeric plastic article when the composite product is present in the mold fitted to the inside surface of the mold and the impermeable polymer film side of the composite product faces the interior of the mold while preventing passage of the injected polymeric plastic through the imitation leather microfibrous fabric and the molded article coated with the composite product.

5 Claims, No Drawings

5,897,410

COMPOSITE PRODUCT CONSISTING OF MICROFIBROUS MATERIAL AND A POLYMER FILM, USEFUL FOR COATING COLD INJECTION MOLDING MANUFACTURED ARTICLES

FIELD OF THE INVENTION

The present invention refers to composite articles, useful in the formed article coating, comprising microfibrous material coupled with a polymer film. The invention further refers to the above composite article manufacturing method as well as the composite article coating of formed objects and the coated articles obtained by the above method.

BACKGROUND OF THE INVENTION

Woven or non-woven microfibrous materials, comprising synthetic polymer microfibers generally consisting of polyester or polyamide are known in the art. Said materials have the appearance of the natural leather and some among these materials, namely the ones in which the polymer microfibrous non-woven material is immersed in a polymer matrix, preferably polyurethane, exhibit "hand", lightweight, velour-like, fastness to light and nitrogen oxide characteristics even better than the natural leather. Moreover those materials, thanks to its good characteristics constitute a valuable product widely used in the garment industry, furniture manufacture, and interior decoration of vehicles, boats and other transportation equipment.

PRIOR ART

In order to be suitable for the use in the field of furniture manufacture and the vehicle interior decoration the microfibrous material can be lined to a cloth, knitted fabric or polystyrene foam providing the product with the required stiffness and mechanical strength. Such a lining is carried out by means of suitable adhesive or by flame heating as it is disclosed in GB-A-2 235 651 and GB-A-2 235 652 of the assignee.

A field in which the microfibrous material could be widely used is the coating of more or less stiff material formed articles when said articles are obtained by the so-called "cold injection molding" process, as for instance in the manufacture of car instrument boards, car interior wallboards or posts, office chairs or arm-chairs and the like.

However the above mentioned microfibrous material lining techniques used in the coupling with clothes and foamed polymeric material are poorly consistent with the typical cold-injection molding article production cycles. In fact the use of the above techniques implies complex and lengthy operation steps affecting the economics of the production cycle.

As a matter of fact the cold injection molding process consists of a liquid polymer injection, such a liquid polymer consisting of two or more components which react with each other within a mold and die system.

Normally the polymeric liquid components are kept separated and are simultaneously injected into the mold through a plurality of extruders (one for each component) in order to prepare the mixture inside the mold.

The component reaction takes place in a short time (about 2 minutes) and it results in a foamed polymer structure having the shape of the mold and die system.

The coating of the above foamed polymer structure is obtained by placing the coating material (textile product or similar) into the mold prior to the polymeric mixture injection, the coating being caused to adhere by vacuum suction technique to the mold internal surface.

It has been found that when the microfibrous material is used as a coating the pressure injected polymeric material may pass through its porous structure resulting in several defects on the coating surface.

SUMMARY OF THE INVENTION

It would be highly desirable to have available a microfibrous material capable to act as a coating of articles manufactured by the cold injection molding process which retains the appearance qualities without being spoiled by the manufacturing process itself.

It is an object of the present invention to provide a microfibrous composite material suitable for coating cold injection molding manufactured articles in the same time as the abovesaid cold injection molding process.

It has been now found, and this is the first object of the invention, a product consisting of a microfibrous material and a polymer film that can be advantageously used to effectively coat cold injection molding manufactured articles in the same time as the production of said articles.

A second object of the invention is a process that can be easily carried out to manufacture the above composite product.

It has to be consider within the scope of the present invention a cold injection molding process suitable to manufacture the abovementioned non woven microfibrous material coated polymeric articles, as well as the coated articles resulting from the above process.

DETAILED DESCRIPTION OF THE INVENTION

The composite material according to the invention can be obtained by coupling the microfibrous material with an impermeable type polymer film. The coupling can be effected with several processes such as gluing by means of an adhesive film inserted between the microfibrous material and impermeable film; by flame coupling technique where the adhesive member is a thin layer of a direct flame melted foamed material; by powder coupling where the adhesive member consists of low melting point polymer powder placed between the microfibrous textile and an impermeable film, that have been melted by hot rolls or I.R. (infrared) ovens.

The roller hot-press systems provide a continuous microfibrous material impermeable film coupling process, an adhesive material having been inserted between the layers (adhesive layer, melted foam, melted polymer powder).

Microfibrous materials useful to carry out the process of the present invention consisting of a microfibrous non-woven fabric essentially obtained from synthetic microfibers, are known in the art. For instance some of the above material, namely the ones consisting of a microfibrous non woven fabric immersed in a synthetic polymer matrix have been disclosed in the Italian Patents 823,055, 921,871, 839,921, 858,337, 905,222, and 873,699. Additional microfibrous, non-woven material manufacturing processes are disclosed in the Italian patent applications MI92A00239, MI92001945, MI92002944, MI92002942 and MI92001952 of the assignee.

Even if in the course of the present description reference will be specifically made to the use of microfibrous non-woven material immersed in a polyurethane matrix, the present invention is not limited to or by this component. Other microfibrous leather-like material can be used to coat cold injection molding manufactured articles in the same time as the molding operations thereof; on this respect reference can be made to microfibrous materials disclosed in Italian patent 1,085,966.

Further leather-like i.e. imitation leather, microfibrous materials useful in the process according to the invention comprise non-woven fabric structure formed by different section or size nicrofibres on a woven or knitted carrier.

Additionally included within the scope of the invention are composites consisting of polymer film and a microfibrous material in which round or non round cross section microfibres form a woven or knitted fabric and the resulting product is submitted to raising process to impart the suede-like appearance.

The microfibrous non-woven materials particularly suitable according to the invention are the ones whose matrix consists of a polymer selected among polyurethanes and derivatives thereof the microfibres consisting of polyester (f.i. polyethylenterephtalate), polyamide, (f.i. nylon 6, nylon 66, nylon 12), polyolefins (f.i. polyethylene, polypropylene) polyacrylonitrile and copolymer thereof.

The composite forming polymer film may be:

Polyether, and/or polyester and/or copolyester mainly based polyurethane;

Polyester, copolyesters;

Polyolefins, as polyethylene or polypropylene;

Polyamide, copolyamides.

A particularly preferred film according to the present invention consists of copolyester of polyethylene terephthalate/isophthalate.

According to a preferred embodiment of the invention, the polymer film is coated with a protective layer of a high melting point polymer material, e.g. polyethylene, polypropylene or polyvinylchloride; such protective coating being removed before the molding operations.

The cold injection molding operations to manufacture the microfibrous, non-woven lined article, using the composite material according to the invention, take a very short time, about 2 to 4 minutes, at a temperature ranging from room temperature to 40–50° C.

The invention will now be illustrated in detail with reference to the following examples which are not to be intended as a limitation of the invention.

EXAMPLE 1

A microfibrous felt has been prepared in accordance with the following known procedure:

The fiber was formed by 57 parts by weight of polyethylene terephthalate, 40 parts by weight of polystyrene polymer and 3 parts by weight of polyethyleneglycol. The 3.8 den. extruded fiber revealed a 16 polyester microfiber content; each microfiber being approximately 0.10–0.11 den.

The fiber was submitted to punching to yield an intermediate felt of 0.195 g/cm3 density and 540 g/m2 weight.

The intermediate felt was immersed into a 20% polyvinyl alcohol water solution, dried and treated with perchloroethylene to remove the polystyrene matrix obtaining a polyvinylalcohol matrix containing fiber. Polyurethane was prepared separately by reacting 4,4'diphenyl-methane-diisocyanate (MDI) (2 mole) with 1 mole of a mixture of polytetrahydrofurane (PTHF) (molecular weight 1976) and polycaprolacton (PCL) (molecular weight 1958) in a molar ratio 3:1 at 65° C. for a period of 3 hours. The resulting prepolymer was dissolved in dimethylformamide to yield a 25% (weight) solution.

A 25% (weight) dimethylformamide (DMF) solution of 4,4'-diaminophenyl-methane (DAPM) (0.825 mole) and n-dibutylamine (DBA) (0.175 mole) was prepared and added to the diluted prepolymer at 65° C.:

The solution was reacted for approximately 30 hours until the concentration reached the value of 25% by weight and the solution was free from NCO groups. The resulting polyurethane solution exhibits a viscosity of approximately 20,000 cps at 20° C.

Polyurethane solution was diluted with DMF to obtain a 13% by weight solution, then the polyethylene terephtalate/polyvinyl alcohol felt prepared as described above was immersed into the polyurethane solution. The excess polyurethane was removed by passing the impregnated felt through squeezing rollers; polyurethane was then coagulated by pouring it in water to remove polyvinyl alcohol.

After the above treatment the product was dried. The resulting material consists of 68±3% by weight of microfiber and 32±3% by weight of polyurethane. The product was lengthwise sliced in 10 mm thick sheets and then submitted to abrasion to impart the suede-like appearance.

EXAMPLE 2

The procedure of Example 1 was repeated with the exception that the 25% by weight prepolymer in dimethyl formamide solution was reacted with, instead of DAPM, 1.65 mole of water containing 0.175 mole of n-butylamine. The extension reaction was carried out at 65° C. for 6 hours. Resulting polyurethane average molecular weight was such as to impart to a 25% by weight dimethylformamide solution at a temperature of 20° C. a viscosity of 20,000 cps.

EXAMPLE 3

The procedure of Example 1 was repeated with the exception that the fiber was prepared from a flame-retardant polyethylene terephtalate FIDION SR commercially available from ENICHEM FIBRE S.p.A.

EXAMPLE 4

The procedure of Example 1 was repeated with the exception that nylon 6 microfibers were used instead of polyethylene terephthalate and a styrene-acrylonitrile copolymer (marketed under the trade name SUN) was employed instead of polystyrene.

EXAMPLE 5

A product similar to Example 1 was prepared by using 4,4'dicyclohexyl methane instead of MDI and 4,4'methylene bis(2,6 diisopropylaniline) instead of DAMP.

EXAMPLE 6

A product was prepared according to the procedure of Example 1 using nylon 6 instead of polyethylene terephthalate. Polyurethane was prepared according to example 5.

EXAMPLE 7

Microfibrous material prepared according to Example 1 was coupled with a copolyester based polyurethane film by using the flame technique where the adhesive material consists of a foamed polyurethane or polyester layer of approximately 2 mm thickness that has melted by a direct flame system.

Three materials a) Microfibrous non-woven fabric, b)surface melted foamed material, and c) polyester films, have been passed through a rollers hot-press system to improve the adhesion.

EXAMPLE 8

Microfibrous non-woven material manufactured according to Example 1 was coupled with a copolyester film using the Hot Melt technique wherein the adhesive material consists of low melting polymer powder, typically polyester or polyamide placed into a hot roller engravings or groves at a temperature higher than the powder melting point. The rotating hot roller deposits the "adhesive points" on microfibrous non woven fabric which in turn is immediately contacted with the copolyester base film in a rollers hot-press system allowing a continuous coupling process.

EXAMPLE 9

Micrfibrous non-woven material manufactured according to Example 1 was coupled with a copolyester film using the melting film gluing technique wherein the melting is inserted between the microfibrous material and the copolyester base film.

A hot-rollers hot-press system operated at such a temperature as to melt the melting film ensures the continuous coupling process.

EXAMPLE 10

The microfibrous product consists of round elliptic cross-section fibers having a diameter size varying around a mean value of $2\mu$, the effective size ranging from 0.5 to $3.5\mu$.

The microfibers immersed in a polyester matrix, are made of nylon 6. The average microfiber count was 0.01 den.

The above microfibrous product was coupled with films according to the procedures of the examples 7, 8 and 9.

EXAMPLE 11

The microfibrous product consists of a woven or knitted fabric inserted into a non-woven structure and immersed into a polyurethane matrix.

The microfibrous product was coupled with films described in examples 7, 8 and 9.

EXAMPLE 12

The microfibrous product consists of isosceles triangle cross-section microfibers included into a woven or knitted structure. The suede like appearance is obtained by a conventional raising process.

Said microfibrous product was coupled with films described in examples 7, 8 and 9.

EXAMPLE 13

Following the procedures of examples 7, 8 and 9, composite products have been prepared comprising the microfibrous non-woven material manufactured according to Example 1 and polyethylene or polypropylene films.

EXAMPLE 14

Following the procedures of examples 7, 8, and 9 composite products have been prepared consisting of the microfibrous non-woven material manufactured according to Example 6 and polyester or polyether based polyurethane films.

EXAMPLE 15

Following the procedure of the previous examples composite products have been prepared comprising the microfibrous non-woven material manufactured according to Example 4 coupled with a polyester or polyether based polyurethane film.

EXAMPLE 16

Following the procedure of the previous examples, flame retarding composite products have been prepared comprising the microfibrous non-woven material manufactured according to Example 3 and polyester or polyether based polyurethane films.

EXAMPLE 17

Following the procedure of Examples 7, 8, and 9 a composite product has been prepared comprising the microfibrous non-woven material manufactured according to Example 6 and a polyolefin film.

EXAMPLE 18

Following the procedure of Examples 7, 8, and 9 a composite product has been prepared comprising the microfibrous non-woven material manufactured according to Example 4 and a polyolefin film.

EXAMPLE 19

Following the procedure of the preceding examples, a flame retarding composite product has been prepared comprising the microfibrous non-woven material manufactured according to Example 3 and a low melting polyolefin film.

EXAMPLE 20

A mold suitable for the "cold injection molding" technique was coated with the composite manufactured according to Example 7, the suede-like side of the microfibrous non woven fabric being directed toward the mold.

The composite product was adhered to the mold by vacuum suction, so that the composite coating perfectly fits to the mold, by adhering to any minimum detail of the mold internal surface.

Subsequently the die was applied to the mold to tightly close the mold edges to prevent any polymeric liquid leakage during the pressure injection operations.

A polymer component mixture was injected under pressure into the mold and die system, the mold being internally coated by the composite manufactured according to example 7. Each component was separately injected through a single extruder. The reactant mixture reacts in a short time of the order of about 2 minutes, forming a foamed solid material having the shape of the mold and die system and coated by the non woven microfibrous material from the mold side.

EXAMPLES 21 AND 22

The procedure according to example 17 was followed using the composite products manufactured according to examples 8 and 9.

EXAMPLES 23, 24, 25, 26, 27, 28, AND 29

The procedure according to example 20 was followed using the composite products manufactured according to examples 13 to 19.

I claim:

1. A composite product comprising an imitation leather microfibrous fabric and an impermeable polymer film coupled thereto by an adhesive material, said impermeable film being so selected that it will adhere as a coating on a polymeric plastic article manufactured in a mold by the cold injection molding technique at the time of the injection molding operations for preparing said polymeric plastic article when the composite product is present in the mold fitted to the inside surface of the mold and the impermeable polymer film side of the composite product faces the interior of the mold while preventing passage of the injected polymeric plastic through the imitation leather microfibrous fabric, wherein the impermeable polymer film consists of a polyethylene terephthalate polyethylene isophthalate copolyester.

2. A composite product comprising an imitation leather microfibrous fabric and an impermeable polymer film coupled thereto by an adhesive material, said impermeable film being so selected that it will adhere as a coating on a polymeric plastic article manufactured in a mold by the cold injection molding technique at the time of the injection molding operations for preparing said polymeric plastic article when the composite product is present in the mold fitted to the inside surface of the mold and the impermeable polymer film side of the composite product faces the interior of the mold while preventing passage of the injected polymeric plastic through the imitation leather microfibrous fabric, wherein the impermeable polymer film is protected by a removable polymer material layer, having a high melting point that is removable before the injection molding operations.

3. A molded article according to claim 2 wherein the removable layer having a high melting point is polyethylene, polypropylene or polyvinyl chloride film.

4. A molded article coated with an imitation leather microfibrous non-woven fabric obtained by a cold injection molding of polymeric material, wherein the composite product defined below is present in the mold for preparing the article, being fitted to the inside surface of the mold with the impermeable polymer film of the composite product facing the interior of the mold, and the cold injection molding process is carried out in said mold, the impermeable film having prevented passage of the injected polymeric material through the imitation leather microfibrous fabric, the composite product comprising an imitation leather microfibrous fabric and an impermeable polymer film coupled thereto by an adhesive material, said impermeable film being so selected that it will adhere as a coating on a polymeric plastic article manufactured in a mold by the cold injection molding technique at the time of the injection molding operations for preparing said polymeric plastic article when the composite product is present in the mold fitted to the inside surface of the mold and the impermeable polymer film side of the composite product faces the interior of the mold while preventing passage of the injected polymeric plastic through the imitation leather microfibrous fabric, wherein the impermeable polymer film is a polyethylene-terephthalate-polyethylene-isophthalate copolyester.

5. A composite product comprising an imitation leather microfibrous fabric and an impermeable polymer film coupled thereto by an adhesive material, said impermeable film being so selected that it will adhere as a coating on a polymeric plastic article manufactured in a mold by the cold injection molding technique at the time of the injection molding operations for preparing said polymeric plastic article when the composite product is present in the mold fitted to the inside surface of the mold and the impermeable polymer film side of the composite product faces the interior of the mold while preventing passage of the injected polymeric plastic through the imitation leather microfibrous fabric, wherein the impermeable polymer film material is polyethylene or polypropylene.

* * * * *